March 31, 1970   R. H. MESERVEY   3,504,283
FLUX QUANTIZATION MEASURING DEVICE
Filed Dec. 13, 1967   3 Sheets-Sheet 1
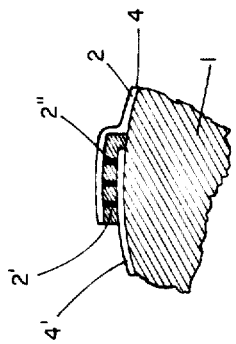
FIG. IC
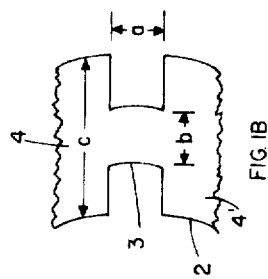
FIG. IB
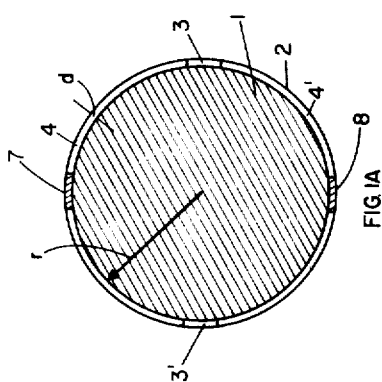
FIG. IA
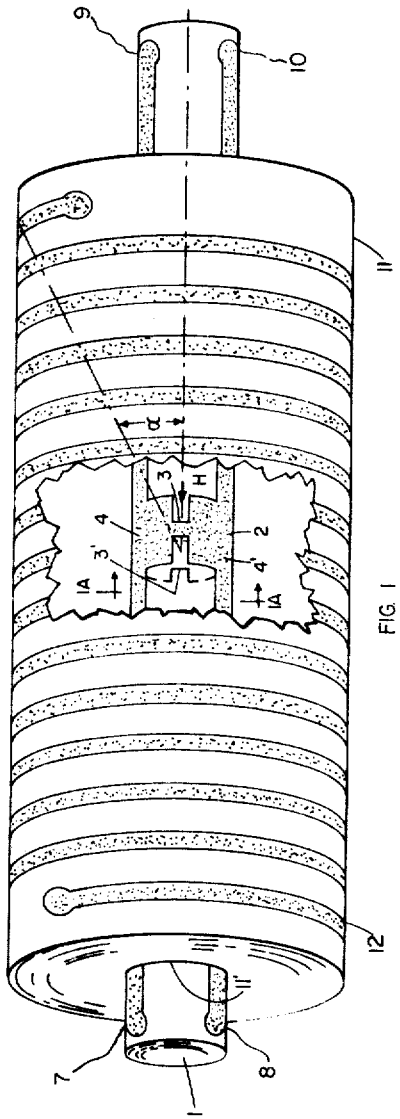
FIG. I
INVENTOR
ROBERT H. MESERVEY
BY
ATTORNEY March 31, 1970  R. H. MESERVEY  3,504,283
FLUX QUANTIZATION MEASURING DEVICE
Filed Dec. 13, 1967  3 Sheets-Sheet 3
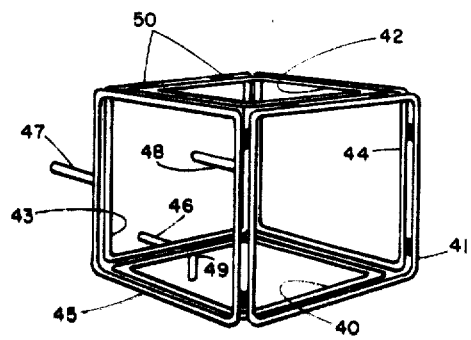
FIG. 5
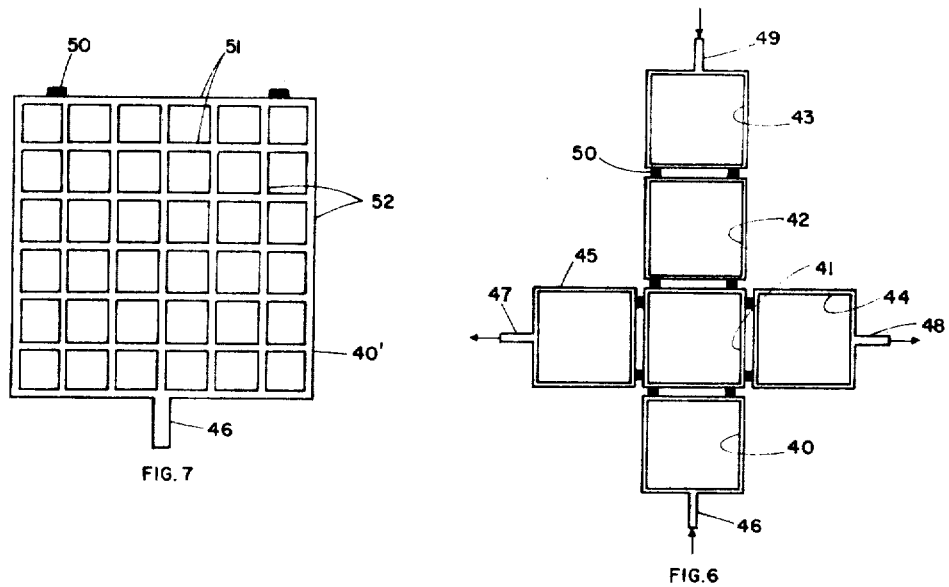
FIG. 7
FIG. 6
INVENTOR
ROBERT H. MESERVEY
BY
ATTORNEY

United States Patent Office 3,504,283
Patented Mar. 31, 1970

3,504,283
FLUX QUANTIZATION MEASURING DEVICE
Robert H. Meservey, Lexington, Mass., assignor to Massachusetts Institute of Technology, Cambridge, Mass., a corporation of Massachusetts
Filed Dec. 13, 1967, Ser. No. 690,145
Int. Cl. G01r *19/08, 33/02;* H03k *3/38*
U.S. Cl. 324—127                        17 Claims

ABSTRACT OF THE DISCLOSURE

A very accurate ammeter having an annular thin-film superconductor with a dimensionally stable central opening of accurately known area and a coil of exactly known dimensions coaxially disposed about the superconductor. The superconductor has a pair of effectively reduced cross-dimension portions which, when an electric current at the critical level is established at these portions and a magnetic field is presented axially to the central opening thereof, provide changes in potential thereacross which varies periodically with the magnetic field, having a maximum each time the value of the flux inside the annulus changes one flux quantum from another maximum. The number and fractional number of flux quanta (or fluxons) are counted to determine the flux contained in the known area of the annular superconductor and related to the current in the coil necessary to produce the magnetic field found to exist. By providing a device in which all the critical dimensions can be determined with great accuracy, and maintained within tolerable limits, an ammeter having an accuracy to 1 part in $10^6$ is provided.

The invention herein described was made in the course of work performed under a contract with the Air Force Office of Scientific Research.

In an article entitled, "Measurement of the Absolute Value of the Penetration Depth Using Flux Quantization," in Low Temperature Physics—LT9 (Part A) Plenum Press, 1965, at pages 455 et seq., the present inventor discusses a phenomenon in connection with the determination of penetration depth of a magnetic field into a pair of substantially thick superconductors. It is noted in the article that if the superconductors are spaced apart by a thin insulator and shorted only at the edges by thin superconductor links and a critical current established in the links, there will appear a voltage across the links which is periodic with changing magnetic flux through the space between the super-conductors. It is further noted that the changes in the magnetic field will result in a series of voltage peaks across the links, the peaks being separated by a magnetic field change of one quantum ($hc/2e$) divided by the effective area of the loop formed by the superconductor. Thus, it should be possible to determine magnetic flux to an accuracy of one flux quantum, $2.1 \times 10^{-7}$ gauss cm.²—or better. It is possible, furthermore, as hereinafter discussed, to relate the flux to the magnetic field at the position of the annulus, the accuracy of the field measurement being limited by the knowledge of the effective area of the annulus and to relate the flux to the electric current in a coil that establishes the magnetic field thereby to determine with like accuracy (provided solenoid dimensions are known accurately) the magnitude of the current, although the high accuracy in the magnetic field or current measurements has not heretofore been realized in prior art devices.

It is, accordingly, a primary object of the present invention to provide an ammeter employing the phenomenon before discussed but in which the dimensions are precisely determined and the flux density of a magnetic field can be determined to an accuracy of 1 part in $10^6$, the magnetic field being established by a current through a solenoidal coil, the magnitude of the current being established from the flux density so determined.

A further object is to provide an ammeter useful as a primary standard.

A still further object is to provide a fluxon meter useful as an element of said ammeter, but having more general utility in measuring magnetic flux or magnetic fields, as well.

Another object is to provide apparatus which will establish a substantially zero magnetic field environment for the ammeter, but having more general utility as well.

These and other objects will be evident in the specification to follow and will be more particularly pointed out in the appended claims.

By way of summary, the principal object of the invention is attained in an ammeter having a dimensionally stable non-magnetic rod with a thin-film annular or otherwise shaped super-conductor secured about the rod. The thin-film superconductor has a pair of effectively reduced cross-dimension portions diametrically disposed to define two wider superconductor regions. A source of direct current connected between two regions is adapted to establish a current in the superconductor near the level at which the conductor ceases to be superconductive at said portions. A dimensionally stable cylinder having an axial opening just slightly larger than the cross dimensions of the rod to receive the rod is provided. A first coil of exactly known dimensions is uniformly spirally formed about the periphery of the cylinder, the coil being adapted to receive an electric current a portion of the magnetic field of which will pass axially through the rod and axially through the central opening of the annulus thereby to cause potential drops to occur at the reduced dimension portions thereof, the potential drops occurring as maximum each time the magnetic flux varies by a value equal to $hc/2e$ from a previous maximum and dropping in magnitude between the maximums. Means is provided for establishing an initial maximum potential or voltage occurrence as well as means for counting the initial and subsequent maximum voltages as the current in the coil is varied, the count (together with the dimensions of the superconductor and the surrounding coil) being a measure of the magnitude of electric current in the coil.

The invention will now be explained with reference to the appended drawings in which:

FIG. 1 is an isometric view, partially cut away, of a part of the ammeter apparatus herein disclosed showing an annular thin-film superconductor with a pair of diametrically disposed reduced cross-dimension portions;

FIG. 1A is a view, on an enlarged scale, taken upon the line 1A—1A in FIG. 1, looking in the direction of the arrows;

FIG. 1B is an enlarged partial view of the super-conductor showing in greater detail said reduced cross-dimension portions;

FIG. 1C is an enlarged partial view of a superconductor wherein the reduced cross-dimension portions shown in FIG. 1 are replaced by an insulated lap joint with shorts of very small cross section through the insulation;

FIG. 5 is a Helmholtz coil configuration;

FIG. 6 shows the coils of FIG. 5 in a planar configuration to enable a zero field condition to exist during the time that the temperature of the Helmholtz coils is reduced to provide superconductivity; and FIG. 7 shows a modification of the coils of FIG. 6.

Figure 2:
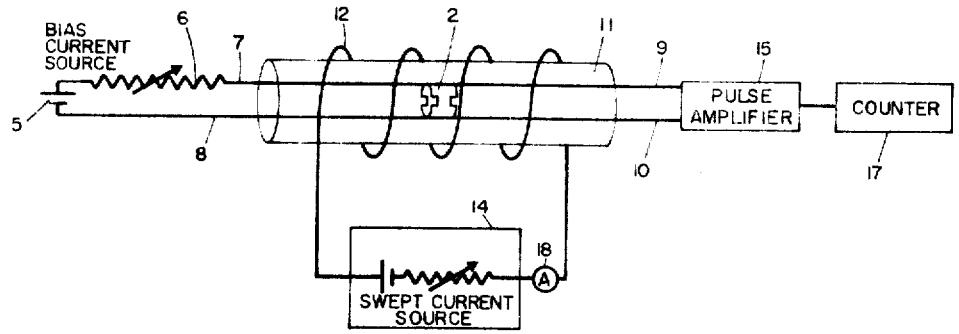
FIG. 2 is a diagram of an embodiment of the present invention and shows, schematically, electrical circuitry omitted from FIG. 1.

Referring now to FIG. 1, a dimensionally stable non-magnetic rod is shown at 1 with a thin-film annular superconductor 2 of about 500 A. thickness secured about said rod. The rod may be made of quartz or other similar material, keeping in mind, however, that the dimensional stability of the rod 1 is of utmost importance for the purposes herein discussed in order that the accuracies of the apparatus be of the order of 1 part in $10^6$, as discussed in greater detail hereinafter. The thin-film superconductor 2 has a pair of effectively reduced cross-dimension portions 3 and 3' diametrically disposed to define two wider superconductor regions 4 and 4'. Whereas in an operative device the regions 4 and 4' may be 10–100 microns in width $c$ in FIG. 1B, the portions 3 and 3' are of much less effective width. The reduced cross-dimension portions 3 and 3' can be provided, as particularly shown in FIG. 1B, by removing a part of the superconductive material. The $a$ and $b$ dimensions shown there are preferably each of the order of 2 microns for best results. Another way of effectively reducing the cross dimensions is by the modification shown in FIG. 1C where the thin film 2, which may again be, for example, 10–100 microns wide, is overlapped about 10 microns with a thin layer 2' of the oxide of the superconductor separating the regions 4, 4' at the junction thereof. Under such circumstances by proper control of oxidation (a thin film lead superconductor maintained for one hour at 100° C. in a $O_2$ atmosphere before the overlapped film is evaporated thereupon will suffice) one or more very short links 2" of the superconductor are formed through each of the oxide barriers resulting in a lapped joint of effectively reduced cross dimensions. The links 2" are of the order of 10–100 A. in length and 100–1000 A. in width.

Figure 4:
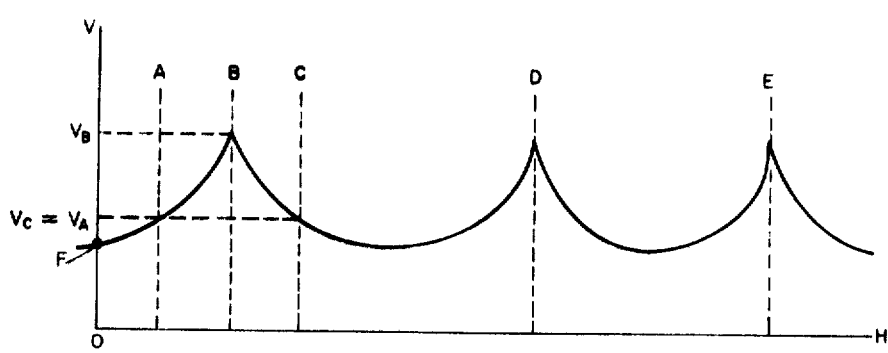
FIG. 4 is a graphical representation showing voltage or electrical potential across said portions as a function of magnetic field axially through the central opening of the superconductor.

A source 5 of variable direct current is adapted to establish a current (through a variable resistance 6 and conductors 7 and 8) in the superconductor 2 near the level at which an electric potential drop occurs across the reduced dimension portions 3 and 3'. At this critical current level any axial magnetic field through the center aperture or opening of the superconductor will cause a change in the potential or voltage drop to occur between the regions 4 and 4' across the reduced dimension portions 3 and 3'; and the potential will occur at a maximum or peak, as shown, for example, at B in FIG. 4, each time the magnetic flux varies by a value equal to $hc/2e$ (where $h$ is Planck's constant, $c$ is the velocity of light and $e$ is the electrical charge of the electron) from a previous maximum (points B, D, E, etc., in FIG. 4) and drop in magnitude between the maximums. If the critical current is established in the conductor 2 with zero field through the aperture of the detector, then any changes in magnetic field can be determined by counting the number of maximums B, D, E, etc., the count proceeding up or down depending upon whether the flux through the conductor is increasing or decreasing. Since the relationship between the flux $\phi$ and magnetic field H is $\phi = \mu H x$ the area of the effective center aperture through the annulus, the accuracy of the measurement and the mechanical stability of the rod 1 cross dimensions can be seen to be quite critical. Furthermore, the permeability $\mu$ of quartz differs slightly from that of vacuum and has been accurately established.

The cross dimensions of the rod 1, of the present invention, as best shown in FIG. 1A, are large compared to the thickness of the thin film which, as before mentioned, is of the order of 500 A. It is essential that the radius be at least $10^6$ times greater than the possible error in measuring the film thickness in order to attain an accuracy of 1 part in $10^6$ in the ammeter. The dimension of 500 A. for the film thickness and $R=0.5$ centimeters meet this requirement since the film thickness can be measured to $\pm 20$ A. or better. In addition it is necessary for the film thickness to be less than the penetration depth of the magnetic field into the superconductor or the flux excluded from the body of the superconducting annulus will be too large to be corrected for the accuracy required. Thus it would be impossible to determine the effective cross area of the aperture in the small-width device in said article since the aperture is of very small area and much of that area is made up of the penetration depth. It has been determined that the effective radius R of the aperture of a detector, as the device described herein, is $R = (r + d/2)$, where $r$ is the radius of the circular rod 1 (i.e. the inner radius of the superconductor) in FIG. 1A, and $d$ is the thickness of the superconductor 2. In the detector 2 herein described (to provide the mentioned accuracy) where the diameter ($2r$) of the aperture is of the order of one cm. (measurable to an accuracy of 5 parts in $10^7$) and the film thickness is 500 A., failure to consider the film thickness and penetration depth thus does not introduce meaningful errors. Therefore, the aperture area can be measured with great accuracy using an optical interferometer and with knowledge of the area the ammeter can be calibrated using the relationship hereinafter presented.

The discussion just made concerns the fluxon meter portion only of the present ammeter device, the remaining elements thereof being included in the explanation to follow.

A dimensionally stable non-magnetic cylinder 11, which may be made of the same material as the rod 1, has an axial opening 11' just slightly larger than the cross dimensions of the rod 1 to receive the rod. A first single layer thin-film coil 12 of exactly known dimensions is uniformly spirally formed about the periphery of the cylinder 11, the coil 12 being adapted to receive an electric current from a swept current source 14, FIG. 2. A portion of the magnetic flux generated by the coil 12 will pass axially through the rod 1 and through the central opening of the annulus 2 thereby to cause potential peaks to occur across the reduced dimension portions 3 and 3', as previously discussed. The voltages thus generated are transmitted from the regions 4 and 4' along conductors 9 and 10, respectively, to an amplifier 15 and thence to a counter 17. If a zero magnetic field condition is established initially, as before mentioned, then the initial maximum voltage, B in FIG. 4, from the detector 2 will be the initial maximum voltage registered on the counter 17, and, since the axial magnetic field will increase in a manner directly proportional to the current in the coil 12, the count at any particular time on the counter 17 will be proportional to the coil current, i.e., $$H = \frac{4\pi n I}{10} (\cos \alpha)$$

where $n$ is turns per centimeter length of the solenoid 12, I is the current in amperes through the solenoid, and $\alpha$ is the angle between the axis of the superconductor 2 and a line drawn to the effective center of the outermost turn of the coil 12 from the center of the superconductor 2, as shown in FIG. 1. The value of H times the permeability of the material filling the coil, in this case quartz, will equal the magnetic flux density. The counter 17 can, therefore, be calibrated in amperes and a properly calibrated device can be used as a standard, for example, to calibrate an ammeter as that shown at 18.

The solenoid 12 hs been described previously as a single layer coil. It may be a thin film which may be evaporated upon the surface of the cylinder 11 and thereafter spirally scribed to separate adjacent turns. In the present device the wire size of the coil 12 need not be large because the detector 2 is quite sensitive to magnetic flux; so a relatively small current (or changes thereof) in the coil 12 can be detected and accurately indicated. The $\cos \alpha$ term in the foregoing equation equals $\sqrt{1-(D/L)^2}$ where D is average diameter of the windings on the solenoid and L is the effective length of the solenoid. In a long solenoid of small diameter the $\cos \alpha$ term approaches 1, and, in any event, measurement of L and D can be made with great accuracy with available instruments. By limiting the coil 12 to a single layer, the need to determine the effective turn diameter of a multi-turn coil is removed. The coil 12 can be of conventional or superconductive characteristics, depending on requirements.

Figure 3:
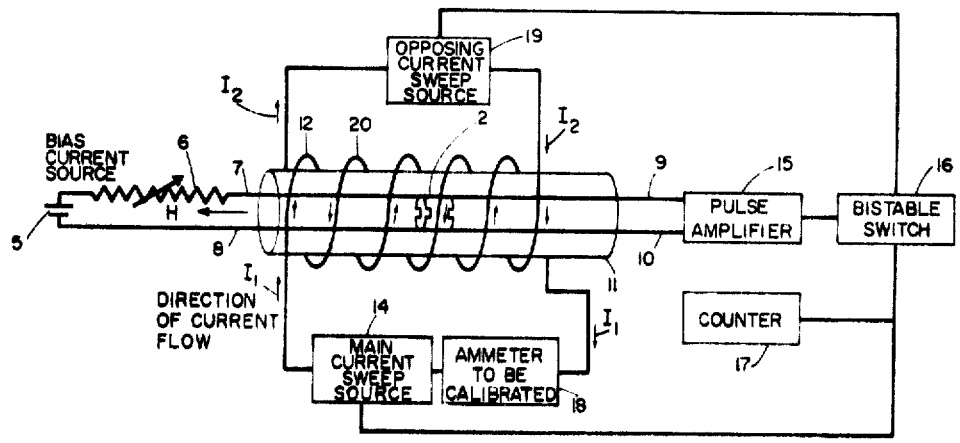
FIG. 3 shows schematically a modification of the apparatus of FIG. 2.

It will be noted that in the explanation just made the axial magnetic field H through the center of the annulus 2 increases indefinitely with current in the coil 12. In FIG. 3 there is shown an arrangement adapted to provide a maximum of about one flux quantum through the superconductor aperture. In addition to the elements described in connection with FIG. 2, there is provided a second coil 20 of high homogeneity uniformly spirally formed about the cylinder 11 and adapted to receive an electric current from an opposing current sweep 19 and establish a magnetic field oppositely directed to the axial field H of the first coil 12. The opposing coil 20 may be a thin film evaporated upon the outer surface of the coil 12 and scribed to provide turns. Unlike the first coil, however, the turn diameter is not critical here because the second coil merely equalizes and opposes the first coil and does not itself provide a measure of current. As before, current to the first coil 12 is supplied by a source 14, here denoted main current sweep. A bistable switch 16 alternately effects energization of the first and second coils in the manner now to be explained in connection with FIG. 4.

As before mentioned, the ammeter is first energized in a zero magnetic field, which may be provided by the Helmholtz coils arrangement to be discussed hereinafter. Initially, then, operation will be at the point designated F in FIG. 4, assuming a critical current in the superconductor. With the bistable switch 16 in its initial position, the main current sweep 14 will increase the current shown at $I_1$ through the main coil 12. The voltage from the detector 2 will increase from the value F to some other value $V_A$ at a point A on the curve and thence to a larger value $V_B$ at the peak B, as the field H increases, the change in flux between F and B being one-half quanta. The circuit constants are such that the peak signal $V_B$ activates the switch 16 after some time delay to operate at point C where the signal level is $V_C$. At point C the switch turns off the sweep in the main current sweep source 14, leaving the current $I_1$ at its then existing value, and turns on the current sweep in the opposing current source 19 increasing the current shown at $I_2$ in the coil 20. Since the magnetic field of the coil 20 opposes the field H, operation of the device will proceed from C to B where again a pulse $V_B$ will be given off by the detector 2 and the field H will reach point A by the time the switch 16 turns off the opposing drive and again turns on the main drive to repeat the cycle. The current $I_1$ in the main sweep will thus advance by steps which correspond to one flux quantum and the flux within the detector will never exceed about one quantum. Since the critical current bias in the detector will change somewhat as the magnetic field H is increased, the differential counting arrangement of FIG. 3 may be preferable to the proposal of FIG. 2, particularly for large numbers of counts. The counter 17 in FIG. 3 circuit is in the main current circuit arm; so pulses at $V_B$ are counted only when the main source 14 is swept.

Previous mention has been made of the Helmholtz coils configuration of FIG. 5. It is known that superconductor coils which are subjected to an axial magnetic field during the time that they are rendered superconductive attempt to retain the flux level within the area enclosed by the coil. Thus, if rendered superconductive in a zero magnetic field, the coil opposes entry of any flux directed generally axially through the central opening but has no effect on a flux directed along the plane of the coil. The box-like construction of FIG. 5 comprising coil sides 40, 41, 42, 43, 44, and 45 provides an inner space which can be made to have a substantially zero magnetic field environment if the coils 40–45 are made superconductive in a zero magnetic field environment. Since it is practically impossible to provide a large-volume substantially zero field condition without a prohibitively costly structure, the best that can be hoped, ordinarily, is that a unidirection field condition can be found. Thus, the box structure of FIG. 5 may be opened to the planar configuration of FIG. 6, the plane of the coils being directed parallel to the magnetic field during the time that superconductivity is being achieved, the coils 40–45 being hingedly secured together to enable the box to be opened out, as shown. A plurality of hinges 50 serve that purpose. The coils 40–45 are made up of a superconductive material surrounded by a fairly thin coaxial cylindrical shell to carry liquid nitrogen and liquid helium to effect superconductivity. It is necessary that the liquids pass from coil to coil; so the hinges 50 preferably each include a flexible tubing to enable passage of both liquids which can be introduced at pipes 46 and 49 and expelled at 47 and 48. Since some axial penetration of field into the coil area exists, the screen-like structure 40' of FIG. 7, comprising a plurality of lateral and longitudinal conductors 51 and 52, respectively, is proposed. The Helmholtz coils configuration of FIG. 5 with or without the screen-like modification provides an economical but effective structure that can be installed at a work bench or other area to provide a low magnetic field environment for the herein described use, or others, to exclude D-C magnetic fields, or even moderate-frequency A-C fields having wavelengths that are long compared to the screen openings.

Modifications of the invention in addition to those herein disclosed, including, for example, rods and cylinders having cross dimensions that are not circular and are made of other materials, as $AL_2O_3$ and SiO, will occur to those skilled in the art.

What is claimed is:

1. An ammeter comprising, in combination, a dimensionally stable non-magnetic rod, a thin-film annular superconductor secured about the rod, the thin-film superconductor having a pair of effectively reduced cross-dimension portions diametrically disposed to define two wider superconductor regions, a source of direct current connected between the two regions and adapted to establish a current in the superconductor near the level at which an electric potential drop occurs across the reduced cross-dimension portions, a dimensionally stable non-magnetic cylinder having an axial opening slightly larger than the cross dimensions of the rod to receive the rod, a first coil of exactly known dimensions uniformly spirally formed about the periphery of the cylinder, the coil being adapted to receive an electric current a portion of the magnetic field of which will pass axially through the rod and through the central aperture of the annulus thereby to cause changes of the potential drop to occur at the reduced dimension portions, the potential drop occurring as a maximum each time the magnetic flux varies by a value equal to $hc/2e$ from a previous maximum and dropping in magnitude between the maximums, where $h$ is Planck's constant, $c$ is the velocity of light and $e$ is the electric charge of the electron, means for establishing the occurrence of an initial maximum potential drop at the reduced dimension portions, means for counting the initial and subsequent maximum potential drops as the current in the coil is varied, the count being a measure of the magnitude of electric current in the coil.

2. An ammeter as claimed in claim 1 and in which the rod and the superconductor are coaxial and the first coil is a single layer spirally formed thin film.

3. An ammeter as claimed in claim 1 and in which the rod and cylinder are made of quartz and in which the magnetic field within the first coil is substantially uniform.

4. An ammeter as claimed in claim 1 and in which a swept current source is connected to supply electric current to said first coil.

5. An ammeter as claimed in claim 1 and in which the counting means comprises a counter connected to record the potential maximums.

6. An ammeter as claimed in claim 1 and in which the counting means comprises a differential counting circuit having a second coil uniformly spirally formed about the cylinder and adapted to receive an electric current and establish a magnetic field oppositely directed to the axial field of the first coil, a main current power source to supply current to the first coil, an opposing current power source to supply current to the second coil, a bistable switch responsive to said potential drop and adapted alternately to effect energization of the first and second coils by the main current power source and opposing current power source, respectively, and a counter to record the potential drop maximums.

7. An ammeter as claimed in claim 6 and in which an amplifier is connected to amplify said potential drop maximums and feed the amplified signal through the bistable switch alternately to the main current power source and the opposing current power source alternately to trigger the change of current from one or the other of the sources.

8. An ammeter as claimed in claim 7 and in which the power sources comprise a main current sweep and an opposing current sweep to feed to first and second coils, respectively, the current in each coil being advanced in steps which correspond to one flux quantum thereby to present a maximum one flux quantum to the aperture.

9. A fluxon meter comprising, in combination, a dimensionally stable non-magnetic rod, a thin-film annular superconductor secured about the rod, the cross dimensions of the rod being large compared to the thickness of the thin film, the thin film superconductor having a pair of effectively reduced cross-dimension portions diametrically disposed to define two wider superconductor regions, a source of direct current adapted to establish a current in the superconductor near the level at which an electric potential drop occurs between said regions, the meter being adapted to be placed in a magnetic field a portion of which passes axially through the rod and through the central opening of the annulus thereby to cause changes of the potential drop to occur, the potential drop occurring as a maximum each time the magnetic flux varies by a value equal to $hc/2e$ from a previous maximum, where $h$ is Planck's constant, $c$ is the velocity of light and $e$ is the electric charge of the electron, means for establishing an initial maximum potential occurrence, and means for counting the initial and subsequent maximum potentials.

10. A fluxon meter as claimed in claim 9 and in which the effectively reduced cross-dimension portions each comprise lap joints, an oxide layer of the material of which the superconductor is made serving to separate the conductors at said joints but having at least one shorted path therethrough at each joint.

11. A fluxon meter as claimed in claim 10 and in which the shorted paths are each 10–100 A. in length and 100–1000 A. in width.

12. A fluxon meter as claimed in claim 9 and in which the superconductor is coaxial with the rod and the cross-sectional area enclosed by the superconductor is measured to an accuracy of at least $10^{-6}$ cm.$^2$.

13. A fluxon meter as claimed in claim 12 in which the rod cross-sectional area is substantially at least $\pi/4$ cm.$^2$.

14. A fluxon meter as claimed in claim 9 and in which the average thickness of the thin film is no greater than 500 A., the width of the thin film is 10 to 100 microns, and the effective length and width of each of the reduced cross-dimension portions is about two microns.

15. A fluxon meter as claimed in claim 9 and in which means is provided to establish a zero field environment for the meter.

16. A fluxon meter as claimed in claim 15 and in which the zero field providing means comprises a plurality of coils disposed in a Helmholtz coils configuration.

17. An ammeter comprising, in combination, a dimensionally stable non-magnetic rod, a thin-film superconductor secured about the rod, the thin-film superconductor having a pair of effectively reduced cross-dimension portions disposed to define two wider superconductor regions, a source of electric voltage connected between the two regions and adapted to establish a current in the superconductor near the level at which the conductor ceases to be superconductive at said portions, a dimensionally stable cylinder having an axial opening slightly larger than the cross dimensions of the rod to receive the rod, a first coil of exactly known dimensions uniformly spirally formed about the cylinder, the coil being adapted to receive an electric current a portion of the magnetic field of which will pass axially through the rod and through the central opening of the super-conductor to cause potential drops to occur at the reduced dimension portions thereof, the potential drops occurring as a maximum each time the magnetic flux varies by a value equal to $hc/2e$ from a previous maximum and dropping in magnitude between the maximums, where $h$ is Planck's constant, $c$ is the velocity of light and $e$ is the electric charge of the electron, means for establishing the occurrence of an initial maximum potential, and means for counting the initial and subsequent potential maximums as the current in the coil is varied, the count being a measure of the magnitude of electric current in the coil.

References Cited

UNITED STATES PATENTS 3,196,411   7/1965   Horwitz _____ 307—206 X

OTHER REFERENCES

B. S. Deaver, Jr. and W. M. Fairbank, Experimental Evidence for Quantized Flux In Superconducting Cylinders, Physical Review Letters, July 15, 1961, pp. 43–46, 324–430.

ALFRED E. SMITH, Primary Examiner

U.S. Cl. X.R.

307—306; 324—43